United States Patent
McAuliffe et al.

(10) Patent No.: US 8,439,070 B2
(45) Date of Patent: May 14, 2013

(54) PISTON VALVE WITH BUILT IN FILTRATION

(75) Inventors: Christopher McAuliffe, Windsor, CT (US); Donald E. Army, Jr., Enfield, CT (US); Jason Labrie, Westfield, MA (US); Kevin Arthur Roberg, Norwich, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 116 days.

(21) Appl. No.: 12/842,087

(22) Filed: Jul. 23, 2010

(65) Prior Publication Data

US 2012/0018659 A1   Jan. 26, 2012

(51) Int. Cl.
*E03B 3/18* (2006.01)

(52) U.S. Cl.
USPC .............. 137/546; 137/544; 251/325; 55/422

(58) Field of Classification Search ......... 137/544, 137/546, 547, 545, 312, 313, 314; 251/62, 251/117, 127, 281, 282, 325; 55/306, 307, 55/422, 308; 210/420, 512.3
See application file for complete search history.

(56) References Cited

U.S. PATENT DOCUMENTS

| | | | | |
|---|---|---|---|---|
| 3,282,289 | A | * | 11/1966 | Vick ........................... 137/375 |
| 3,964,516 | A | * | 6/1976 | Purton et al. ............. 137/625.38 |
| 4,002,319 | A | * | 1/1977 | Pool et al. ..................... 251/282 |
| 4,022,247 | A | | 5/1977 | Schweitzer et al. |
| 4,037,615 | A | * | 7/1977 | Gongwer ........................ 137/1 |
| 4,553,407 | A | | 11/1985 | Rannenberg |
| 4,681,610 | A | | 7/1987 | Warner |
| 4,769,050 | A | * | 9/1988 | Shaw et al. ..................... 96/191 |
| 4,807,890 | A | * | 2/1989 | Gorman et al. ............... 277/346 |
| 4,829,775 | A | | 5/1989 | Defrancesco |
| 5,016,524 | A | * | 5/1991 | Kawai et al. .................... 92/182 |
| 5,343,692 | A | | 9/1994 | Thomson et al. |
| 5,492,150 | A | | 2/1996 | Aquilino |
| 5,553,461 | A | | 9/1996 | Hitzigrath et al. |
| 5,769,123 | A | * | 6/1998 | Heestand et al. ........ 137/625.38 |
| 5,784,894 | A | | 7/1998 | Army, Jr. et al. |
| 6,029,691 | A | * | 2/2000 | Tavor ........................... 137/219 |
| 6,331,195 | B1 | | 12/2001 | Faust et al. |
| 6,524,373 | B2 | | 2/2003 | Afeiche et al. |
| 6,666,338 | B1 | | 12/2003 | Henriksson et al. |
| 7,266,958 | B2 | | 9/2007 | Milde et al. |
| 2010/0037964 | A1 | | 2/2010 | Nalini et al. |

FOREIGN PATENT DOCUMENTS

| | | |
|---|---|---|
| DE | 701212 | 1/1941 |
| DE | 1283062 | 11/1968 |
| DE | 2457960 | 6/1976 |
| GB | 628455 | 8/1949 |

OTHER PUBLICATIONS

Extended European Search Report dated Jun. 5, 2012 for EP Application No. 11173324.2.

* cited by examiner

*Primary Examiner* — Stephen M Hepperle
*Assistant Examiner* — Andrew J Rost
(74) *Attorney, Agent, or Firm* — Carlson, Gaskey & Olds, P.C.

(57) ABSTRACT

A control valve includes particle and moisture accumulation inhibiting features. The control valve includes a piston that provides for pressure communication to a back cavity through a tortuous path that settles out particle matter carried within the airflow. Moreover, the piston includes drainage openings that direct moisture out of piston and away from the sealing surfaces.

6 Claims, 4 Drawing Sheets

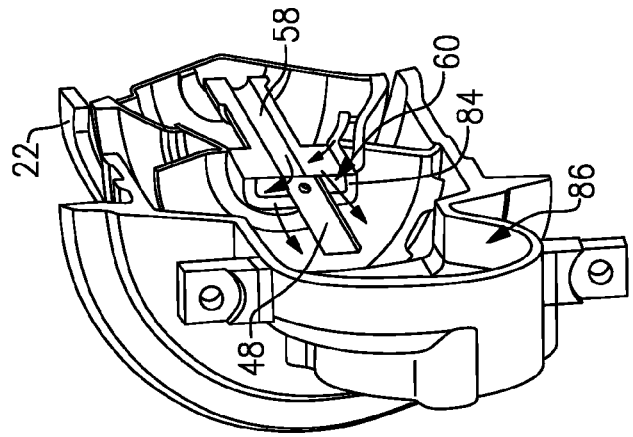
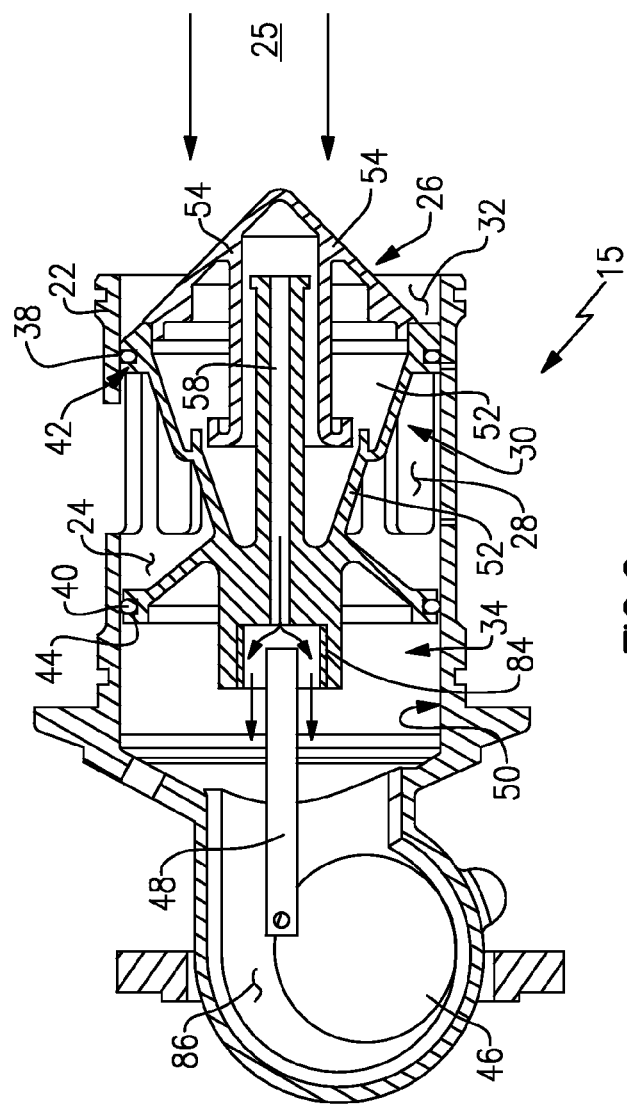

PISTON VALVE WITH BUILT IN FILTRATION

BACKGROUND

This disclosure generally relates to a bypass valve that includes a piston with features that filter particulate contaminates and moisture from functional areas of the valve.

An environmental control system aboard an aircraft directs a portion of airflow for use in cabin air conditioning. Airflow bypassed for use in the cabin air conditioning systems include particulate contaminates that can adversely affect bypass valve operation. Moreover, air bypassed into the air conditioning systems may include water that enters the bypass valve. Water and accumulated contaminates within the bypass valve can cause undesired operation of the bypass valve.

SUMMARY

A disclosed environmental control system includes control valves having particle and moisture accumulation inhibiting features. The control valve includes a piston that provides for pressure communication to a back cavity through a tortuous path that settles out particle matter carried within the airflow. Moreover, the piston includes drainage openings that direct moisture out of piston and away from the sealing surfaces.

These and other features disclosed herein can be best understood from the following specification and drawings, the following of which is a brief description.

BRIEF DESCRIPTION OF THE DRAWINGS

FIG. 2 is a cross-section of an example control valve governing airflow through the example environmental control system.

FIG. 5 is another rear view of the example piston.

DETAILED DESCRIPTION

Figure 1:
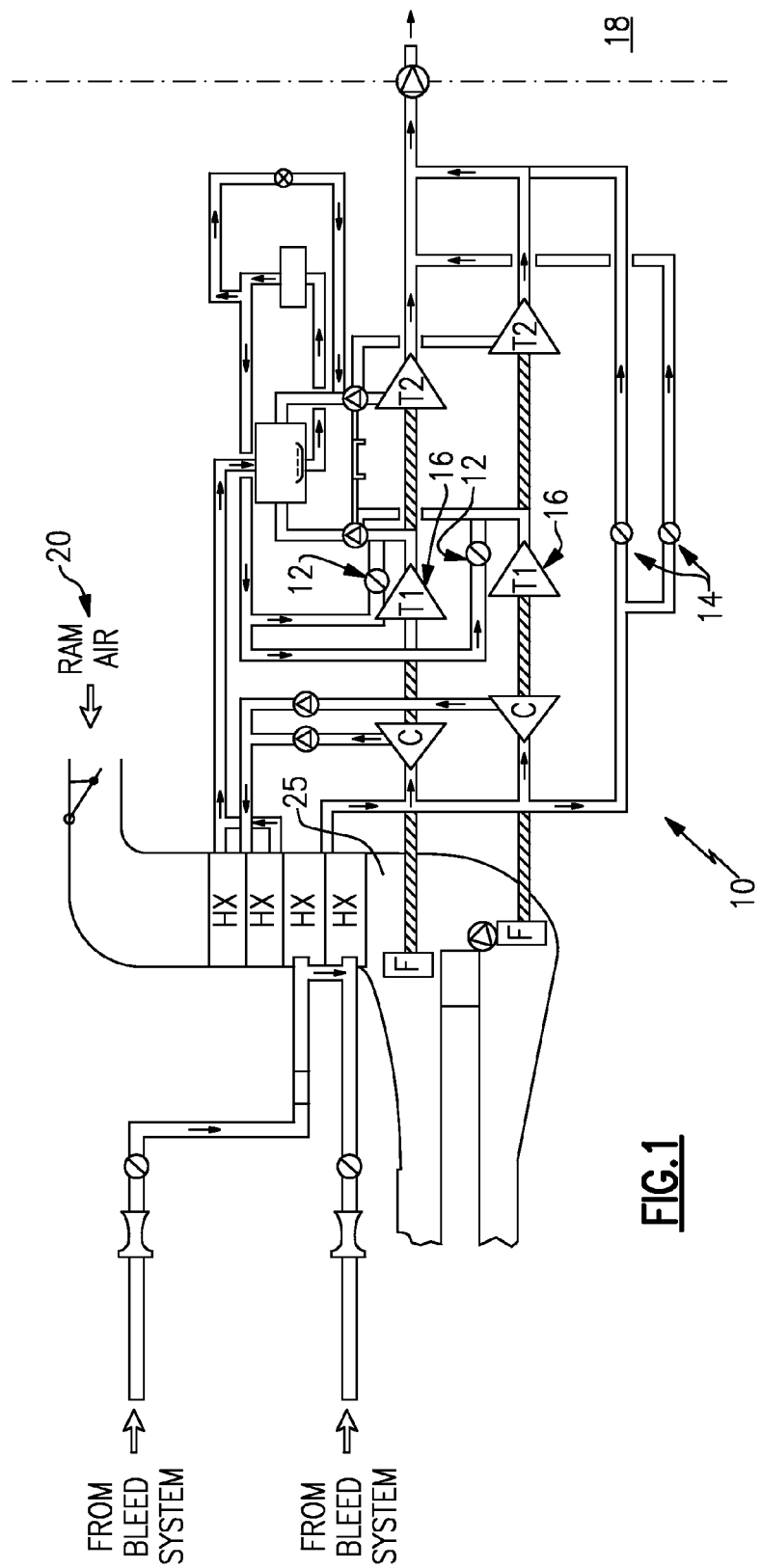
FIG. 1 is a schematic of an example flow control system for an environmental control system.

Referring to FIG. 1, an example environmental control system is schematically indicated at 10 and includes turbine bypass valves 12 and temperature control valves 14 that control airflow tapped from main ram airflow 20. The turbine bypass valves 12 control airflow bypassed around first stage turbines 16 to control condenser inlet temperature. The temperature control valves 14 operate to bypass air to control an outlet temperature of the airflow schematically shown at 18. Each of the turbine bypass valve 12 and the temperature control valves 14 include a common configuration that will be referred to hereinafter as a control valve 15 (FIG. 2). Moreover, although the example control valve 15 is disclosed assembled as a functioning part of the example environmental control system 10, other applications and systems requiring control of airflow will benefit from this disclosure.

Referring to FIG. 2, the example control valve 15 includes a housing 22 that defines a bore 24. The bore 24 includes a forward inlet 26 that receives air from a main air passage 25 that is fed to outlets 28. A piston 30 is disposed within the bore 24 and moves to partially block the outlets 28 and control airflow. The piston 30 divides the bore 24 into a front cavity 32 that includes the inlet 26 and a back cavity 34 disposed behind the piston 30. The piston 30 includes a front seal 38 disposed within a front annular groove 42. The front seal 38 prevents airflow past the piston 30.

Pressure and airflow at the front cavity 32 is communicated through the piston 30 to the back cavity 34 to substantially equalize pressure on each side of the piston 30. As appreciated, equalizing pressure across the piston 30 reduces the force required by an actuator 46, to move the piston 30 to a desired position.

The piston 30 is attached to the actuator 46 by a connecting rod 48. The example actuator 46 includes a circular member attached to the connecting rod 48 to facilitate forward and back movement of the piston 30. Other actuator and linkage configurations are also within the contemplation for use with the disclosed control valve 15.

Figure 3:
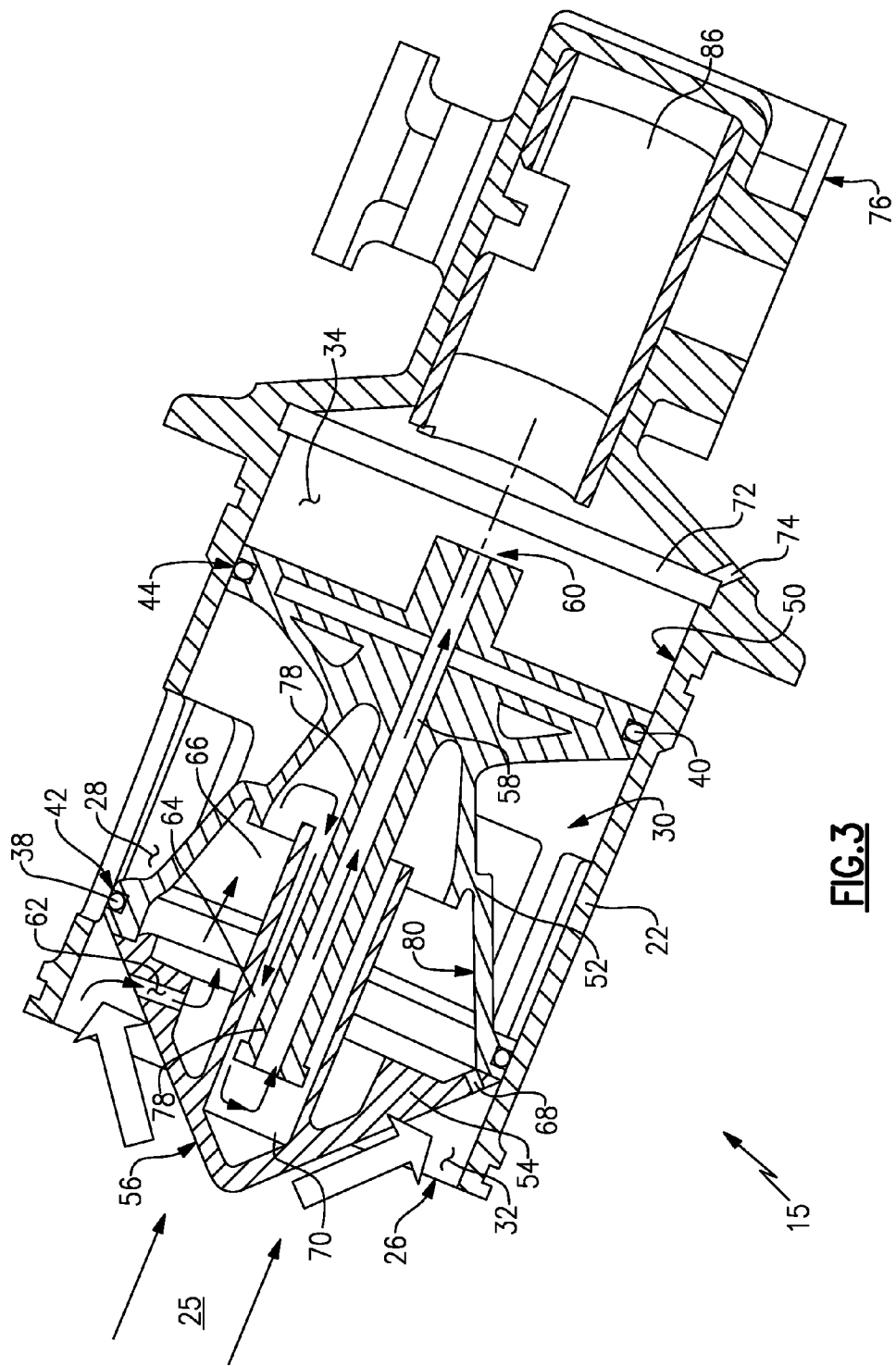
FIG. 3 is a cross-section of an example piston of the example control valve.

Referring to FIG. 3, with continued reference to FIG. 2, the piston 30 includes a main housing 52 and a cap 54. The cap 54 includes an angled external surface 56 that directs airflow from the inlet 26 to the outlet 28. The example angled external surface 56 is conical; however other angled surface configurations are within the contemplation of this disclosure. The main housing 52 includes a communication passage 58 that leads to an exit opening 60. The communication passage 58 extends longitudinally through the main housing 52 but does not extend through to the front cavity 32. The cap 54 includes a transverse passage 62 that leads into a settling chamber 66. The settling chamber 66 is an open space defined by the main housing 52 and the cap 54. The settling chamber 66 is disposed annularly about a central column 78. The communication passage 58 is defined through the central column 78 and extends into a hollowed interior portion defining chamber 70 of the cap 54.

The communication passage 58 is in communication with an annular passage 64 defined between a portion of the cap 54 and a surface of the central column 78. The annular passage 64 defines a tortuous path for airflow to slow momentum such that particulate matter carried with the airflow will drop out within the settling chamber 66.

Airflow entering the passage 62 into the settling chamber 66 is transverse to airflow entering through the inlet 26. Accordingly, some of the airflow momentum is reduced by the transverse orientation of the inlet 26 relative to incoming airflow. An exit from the settling chamber 66 is transverse to the inlet 26 and disposed on an opposite end of the settling chamber 66 from the inlet 26. The exit is further orientated such that airflow must double back into the passage 64. Within the passage 64 air flows forward toward the chamber 70 and into the communication passage 58. Airflow then doubles back again, further reducing any momentum, into the communication passage 58 and out through the exit 60. The tortuous path reduces airflow momentum and traps particulate matter within the piston 30.

Moisture may also be carried within the airflow that flows through the piston 30. Moisture that accumulates within the settling chamber 66 drains out the front of the cap 54 through drain opening 68. The settling chamber 66 includes an angled surface 80 that directs water and moisture to and through the drain opening 68. The example angled surface 80 is disposed at an angle determined in view of the orientation in which the control valve 15 will operate such that water will flow through the drain opening 68. In this example, the angled surface 80 provides an approximately 20 degree angle; however, other angles that facilitate water drainage are within the contemplation of this disclosure.

The back cavity 34 of the bore 24 includes a ring bore 50 that provides a desired sealing surface that operates with the rear seal 40. Even though most moisture within the airflow will be drained out the front of the piston 30 through the drain opening 68, some moisture may reach the back cavity 34. Accordingly, the back cavity 34 includes an annular groove 72 that captures moisture and directs that moisture to a drain opening 74. The example drain opening 74 is angled to draw water out of the annular groove 72 and away from the rear of the piston 30.

Figure 4A:
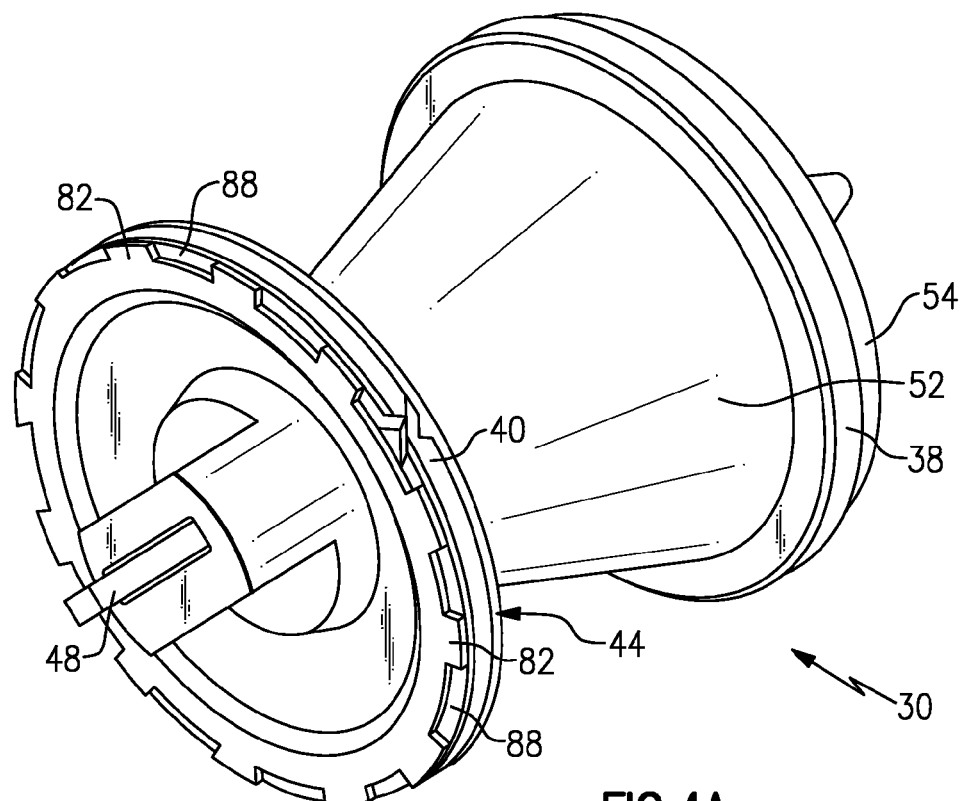
FIG. 4A is a rear perspective view of the example piston.
Figure 4B:
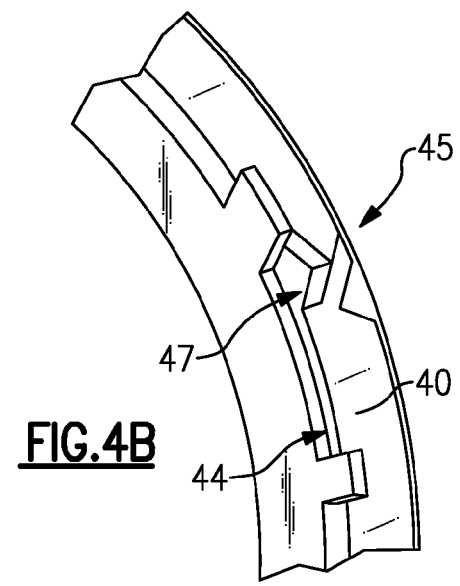
FIG. 4B is an enlarged view of an example rear sealing ring.

Referring to FIGS. 4A and 4B, with continued reference to FIG. 3, the rear seal 40 includes a chamfered lap joint 45 that provides for expansion and contraction of the seal 40. The expansion and contraction provided by the lap joint 45 prevents the accumulation of debris, contaminants and moisture within the rear annular groove 44. The lap joint 45 includes chamfered abutting ends 47. Moreover, the rear annular groove 44 includes slots 88 alternated with castellations 82 that prevent the accumulation of contaminates. Any contaminates that may accumulate within the rear annular groove 44 are pushed and flushed out through the slots 88 thereby preventing buildup that could adversely effect piston performance.

Referring to FIG. 5, with reference to FIGS. 2 and 3, airflow exiting the rear exit 60 will impact the connecting rod 48 and be directed radially outward against the ring bore 50. A shroud 84 is provided to deflect radial airflow in the axial direction to prevent impinging flow against the ring bore 50. Preventing impinging flow against the ring bore 50 reduces wear and prevents abrasion of the sealing surface provided by the ring bore 50.

Referring to FIG. 3, a portion of the actuator 46 (Shown in FIG. 2) is disposed within a back chamber 86 in communication with the back cavity 34. The back chamber 86 includes a groove 76 for further exhausting moisture that may manage to carry through the piston 30.

Accordingly, the disclosed control valve 15 provides for the separation and drainage of water and particle contaminates that could degrade valve performance. The piston 30 provides a settling chamber 66 that substantially reduces airflow momentum such that particles fall out of the airflow and remain within the piston 30. Moreover, the rear annular groove 44 and seal 40 include features that inhibit accumulation of moisture and particle matter.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A piston for a bypass valve comprising:
a main housing including a settling chamber and an exit passage that leads to an outlet through a backside of the main housing;
a cap mounted to the main housing including an inlet passage transverse to the exit passage and an exterior surface for directing airflow; and
a rear-sealing ring supported by the main housing for sealing against an interior surface of the bypass valve, wherein the main housing includes a central column through which the exit passage extends and the cap includes a chamber that receives the central column such that an annular passage is defined between an outer surface of the central column and an interior surface of the chamber.

2. The piston as recited in claim 1, wherein the annular passage extends longitudinally parallel with the exit passage.

3. The piston as recited in claim 1, wherein the settling chamber surrounds the central column and includes an angled surface for directing moisture to a front side of the piston.

4. The piston as recited in claim 3, wherein the cap includes an opening that corresponds with the settling chamber for directing moisture out of the settling chamber.

5. The piston as recited in claim 1, wherein the rear-sealing ring is split and includes a chamfered joint for preventing contaminant build up of within an annular groove supporting the seal.

6. The piston as recited in claim 1, including an annular groove for supporting the rear-sealing ring, the annular groove including a slotted back wall for preventing the accumulation of contaminants.

* * * * *